Feb. 4, 1941.  J. R. MORRIS  2,230,651
CUTTING MACHINE
Filed Sept. 25, 1939  10 Sheets-Sheet 1

Inventor
JOSEPH R. MORRIS.
Frank Fraser
Attorney

Feb. 4, 1941. J. R. MORRIS 2,230,651
CUTTING MACHINE
Filed Sept. 25, 1939 10 Sheets-Sheet 3

Inventor
JOSEPH R. MORRIS.
By
Frank Fraser
Attorney

Feb. 4, 1941. J. R. MORRIS 2,230,651
CUTTING MACHINE
Filed Sept. 25, 1939 10 Sheets-Sheet 4

Inventor
JOSEPH R. MORRIS.
By Frank Fraser
Attorney

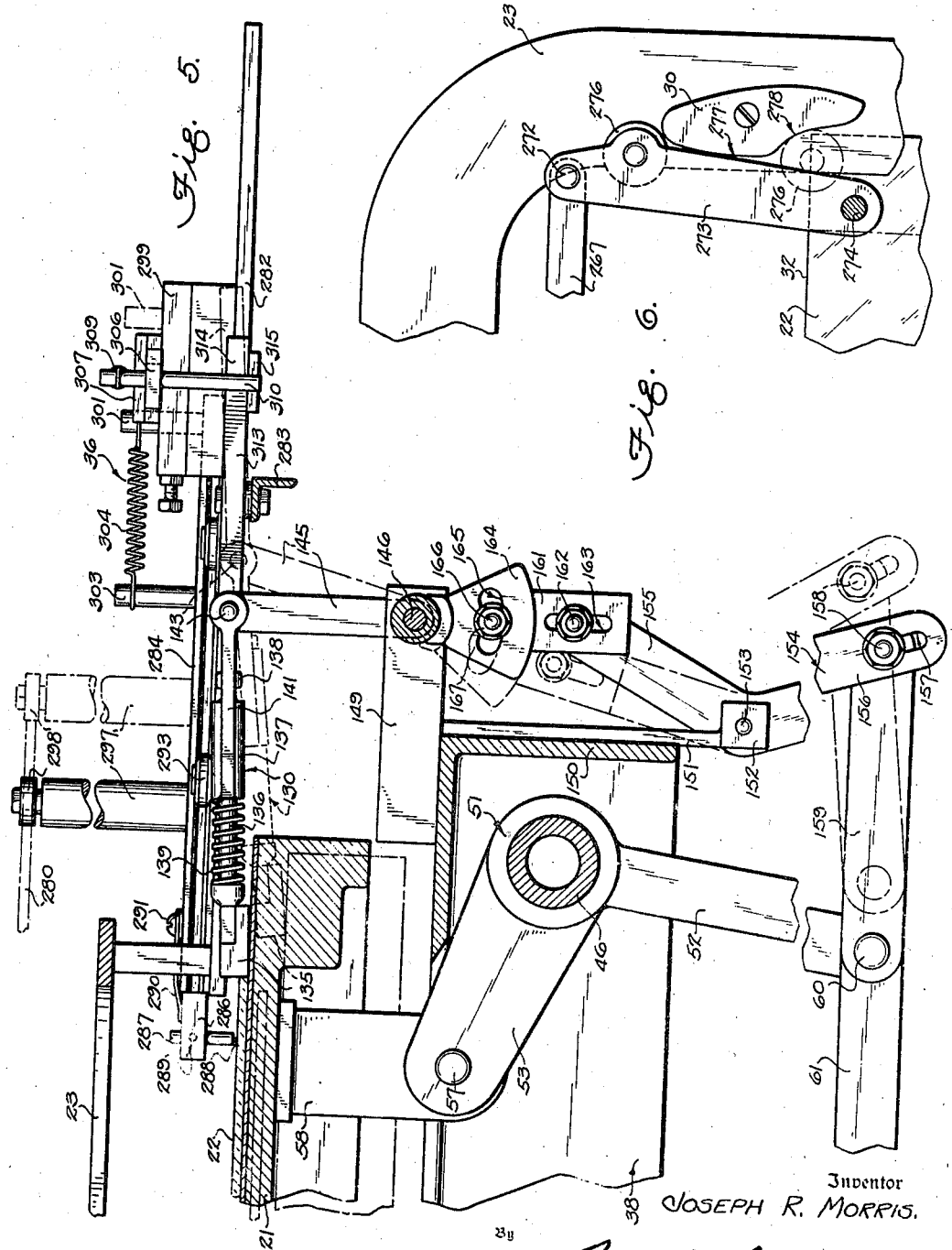

Feb. 4, 1941.  J. R. MORRIS  2,230,651
CUTTING MACHINE
Filed Sept. 25, 1939   10 Sheets-Sheet 6

Inventor
JOSEPH R. MORRIS.
By Frank Fraser
Attorney

Feb. 4, 1941.  J. R. MORRIS  2,230,651
CUTTING MACHINE
Filed Sept. 25, 1939    10 Sheets-Sheet 7

Inventor
JOSEPH R. MORRIS.
By Frank Fraser
Attorney

Feb. 4, 1941.   J. R. MORRIS   2,230,651
CUTTING MACHINE
Filed Sept. 25, 1939   10 Sheets-Sheet 8

Inventor
JOSEPH R. MORRIS.
By Frank Fraser
Attorney

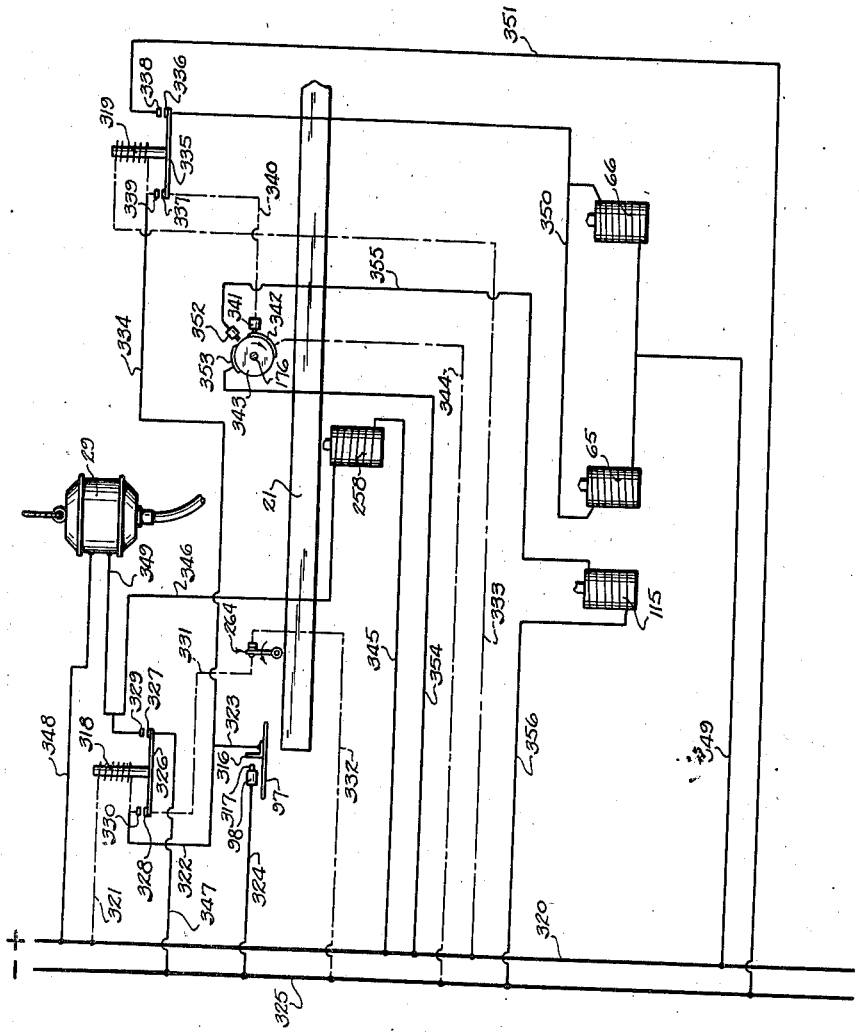

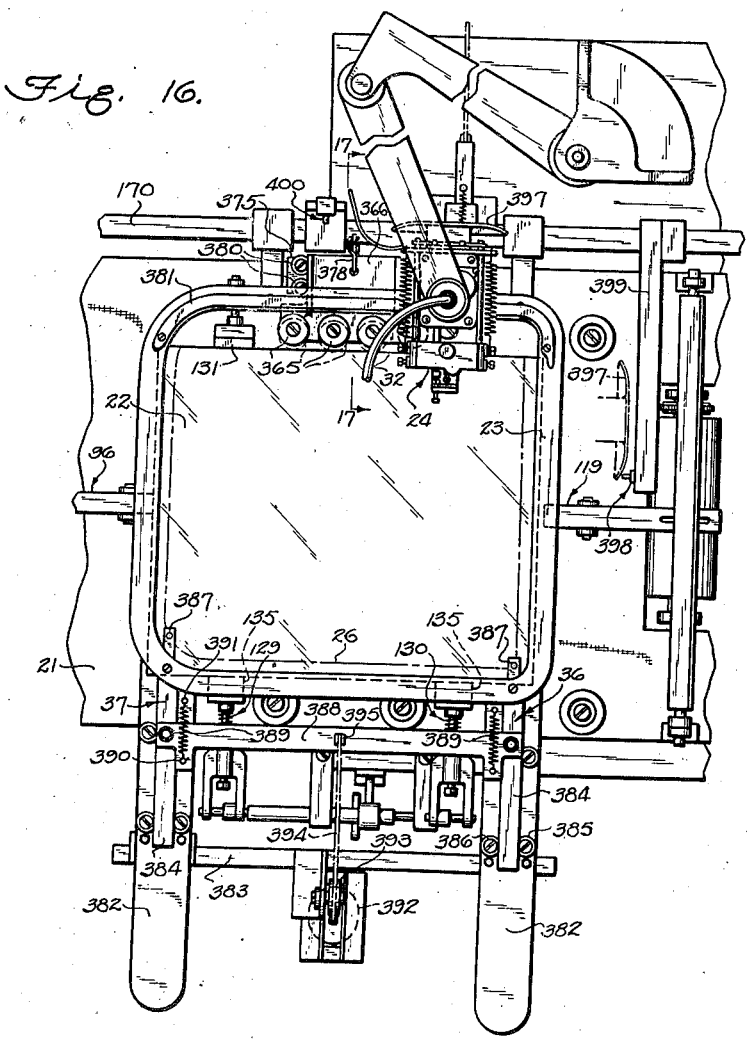
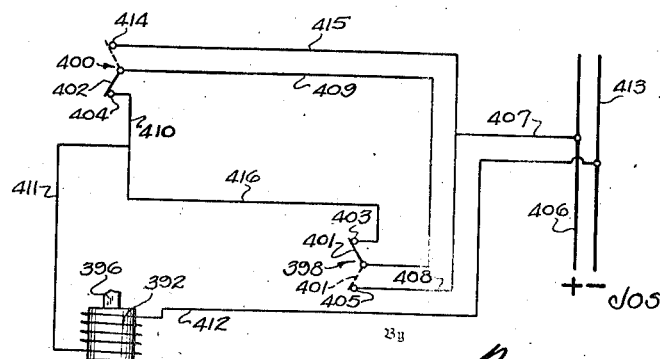

Patented Feb. 4, 1941

2,230,651

UNITED STATES PATENT OFFICE 2,230,651

CUTTING MACHINE

Joseph R. Morris, Toledo, Ohio, assignor to Libbey-Owens-Ford Glass Company, Toledo, Ohio, a corporation of Ohio Application September 25, 1939, Serial No. 296,444

21 Claims. (Cl. 33—27)

The present invention relates to cutting machines in general and more particularly to a machine designed primarily for the cutting of glass sheets or plates, although it is obviously not restricted to such use.

It is an aim of this invention to provide an improved cutting machine of novel construction, combination, and arrangement for cutting out from sheets or plates of glass or the like forms or lights of predetermined regular or irregular outline, rapidly, accurately, and economically.

The machine herein provided is of especial utility in those cases where it is desired to effect the cutting out of a relatively large number of sheets or plates of the same shape and size such as, for example, the door and window lights or half-windshields of automotive vehicles. Briefly, the machine embodies a table for supporting the glass sheet to be cut, a template or pattern member of predetermined shape and size mounted above said table, and a cutting unit mounted upon and movable along said template and having a cutting tool for effecting the scoring of the sheets along a predetermined line of cut corresponding to the shape of the template.

Among the many novel features of the cutting machine of this invention are the provision of means for feeding the sheet into cutting position upon the table and for delivering it therefrom subsequent to cutting; means for automatically bringing the sheet to a stop when it reaches a predetermined position on said table; means for accurately positioning the sheet upon the table and for preventing accidental displacement thereof during cutting; a motor automatically actuated when the sheet is properly located upon the table for driving the cutting unit around said template; means controlled by movement of the cutting unit for shutting off said motor when said cutting unit reaches a predetermined position; means for bringing the cutting unit to a stop after the power thereto has been discontinued and the said cutting unit reaches the end of its cutting cycle; means for lifting the cutting tool and placing it upon the sheet to be cut slightly inwardly of the edge thereof at the beginning of the cutting operation and for also raising said cutting tool from the sheet just before it leaves said sheet at the completion of the cutting operation whereby to prevent chipping or spalling of the sheet edge as well as damage to the cutting tool; additional cutting tools for making so-called entering cuts or vents extending inwardly from an edge of the sheet to the line of cut made by said cutting unit to facilitate subsequent breaking of the sheet; and means for automatically rendering the sheet stop means ineffective to permit the discharge of the sheet after it has been cut from the table.

Other objects and advantages of the invention will become more apparent during the course of the following description when taken in connection with the accompanying drawings.

In the drawings wherein like numerals are employed to designate like parts throughout the same:

Fig. 5 is a vertical transverse section taken substantially on line 5—5 of Fig. 1;

Fig. 6 is a detail plan view showing the means for lifting the cutting tool and placing it upon the sheet slightly inwardly of the edge thereof at the beginning of the cutting operation;

Fig. 14 is an electrical wiring diagram illustrating the operation of the various parts of the machine;

Fig. 15 is a view of a sheet showing the manner in which it is scored upon the machine;

Fig. 16 is a plan view of a cutting machine of somewhat modified construction;

Fig. 18 is an electrical wiring diagram illustrating the operation of the cutting tools for making the entering cuts in the machine of Figs. 16 and 17.

*General statement*

Figure 1:
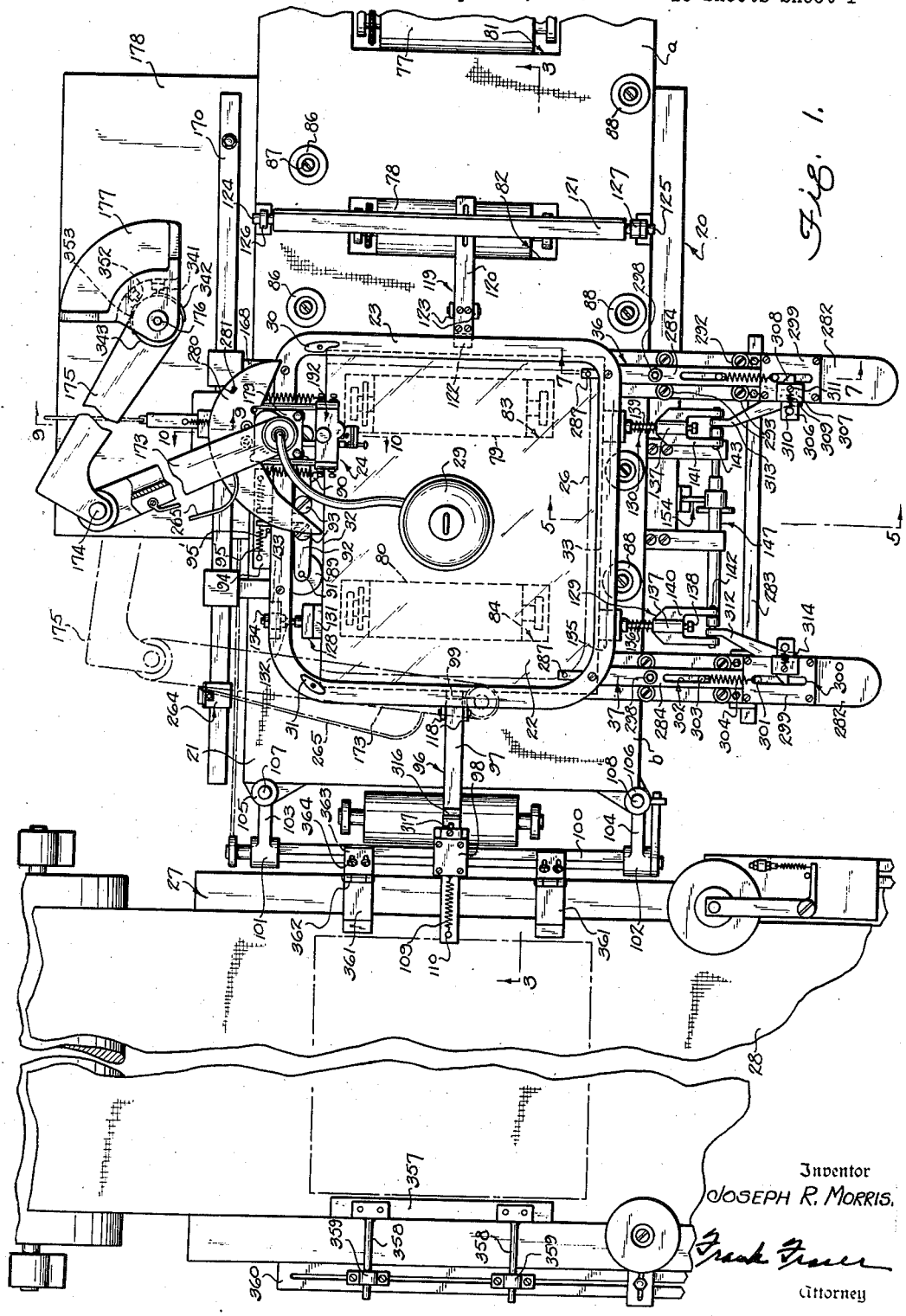
Fig. 1 is a plan view of a cutting machine constructed in accordance with the present invention.

Briefly, the cutting machine of this invention comprises a table supporting structure 20 having associated therewith a flat, horizontal top 21 for supporting the sheet of glass or the like 22 during the cutting thereof. Arranged above the table top 21 in vertically spaced relation thereto is a horizontal track template 23 having the same configuration as the form or light to be cut out from the glass sheet. Mounted upon the track template 23 and guided thereby is a power driven cutting unit designated in its entirety by the numeral 24 and provided with a rotatable steel cutting wheel 25 (Fig. 10), said unit being adapted to travel around the template 23 to score the glass sheet 22 along the line of cut indicated at 26 in Figs. 1 and 15.

In accordance with the invention, means is provided for automatically raising the table top 21 and glass sheet supported thereon just prior to the cutting operation and for maintaining them in elevated position during the said cutting operation, upon the completion of which the said table and sheet are automatically lowered. The machine further embodies means for feeding the glass sheet forwardly upon the table into proper position beneath the cutting unit and for also discharging the sheet from said table after it has been cut. Upon leaving the cutting table, the sheet is adapted to be received upon a suitable take-off conveyor 27 provided with a traveling surface 28 for receiving the said sheet and carrying it away preferably at substantially right angles relative to said table. Means is also provided for automatically bringing the sheet to a stop when it reaches a predetermined position upon the cutting table and for accurately positioning the said sheet upon said table and for preventing accidental displacement thereof during cutting.

The travel of the cutting unit 24 around template 23 is effected by a motor 29 (Fig. 1), and means is provided for automatically shutting off the motor when the cutting unit approaches the end of its cutting cycle so that said unit is permitted to coast the balance of said cycle. Means is provided for first slowing down the travel of the cutting unit after the motor has been shut off and then bringing said unit to a stop at the completion of its cutting cycle. In order to prevent chipping or spalling of the sheet edge as well as injury to the cutting tool 25 as said tool passes onto or leaves the sheet, cam members 30 and 31 (Fig. 1) are carried by the template 23 and are adapted to lift the cutting tool 25 and place it upon the sheet slightly inwardly of the back edge 32 thereof at the beginning of the cutting operation and to subsequently lift the cutting tool from the sheet just before it reaches the edge 32 at the completion of the cutting operation.

To facilitate the subsequent breaking of the scored sheet, it is preferred that so-called entering cuts or vents be made which extend from the front edge 33 of the sheet inwardly to the score line 26 made by the cutting tool 25. These entering cuts are shown at 34 and 35 in Fig. 15 and are formed by the cutters 36 and 37 respectively (Fig. 1). In Fig. 15 is shown a glass sheet scored upon the machine herein provided.

The machine further embodies various other novel features of construction, arrangement, and operation, all of which will be more fully hereinafter described.

*Cutting table construction*

Figure 2:
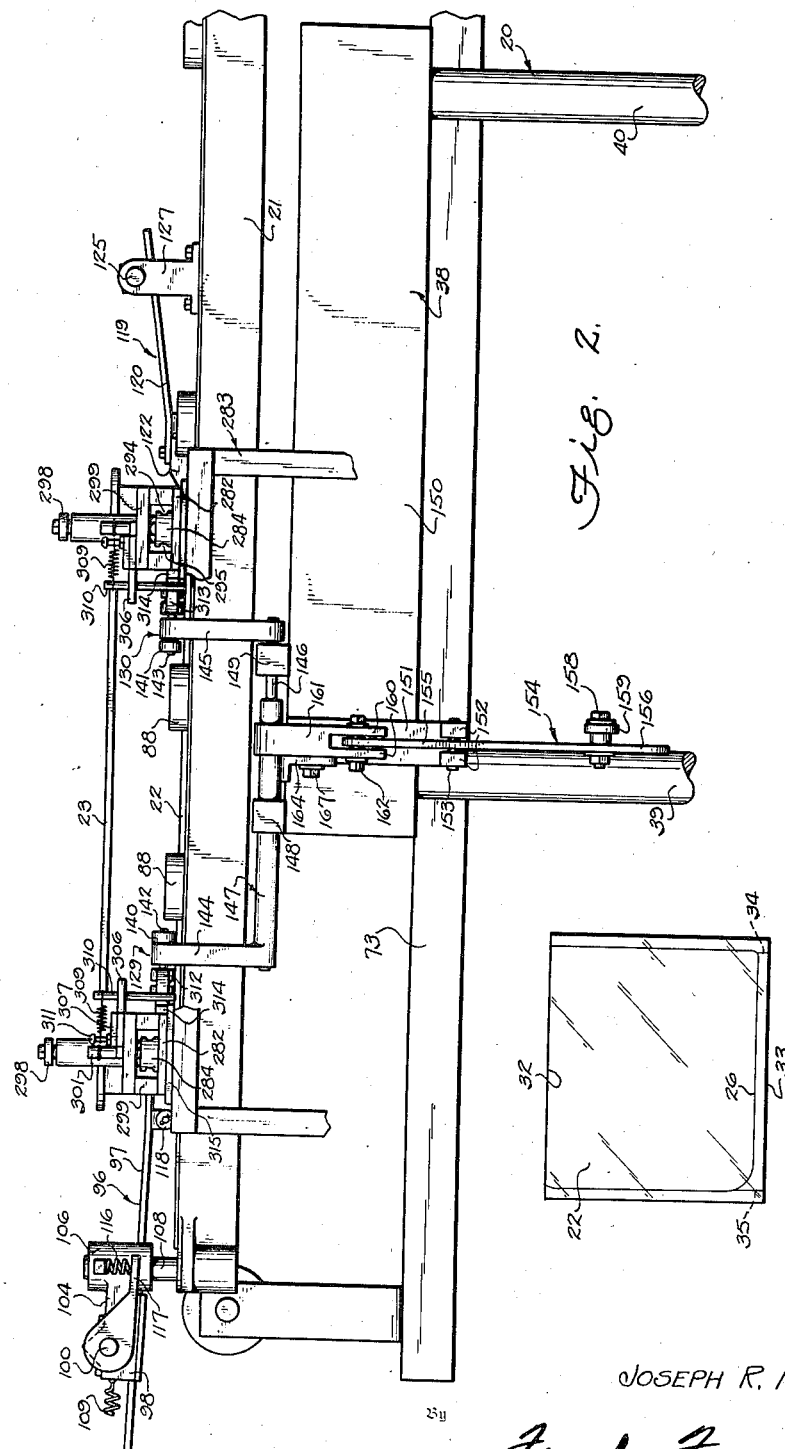
Fig. 2 is a front view thereof.
Figures 3, 13:
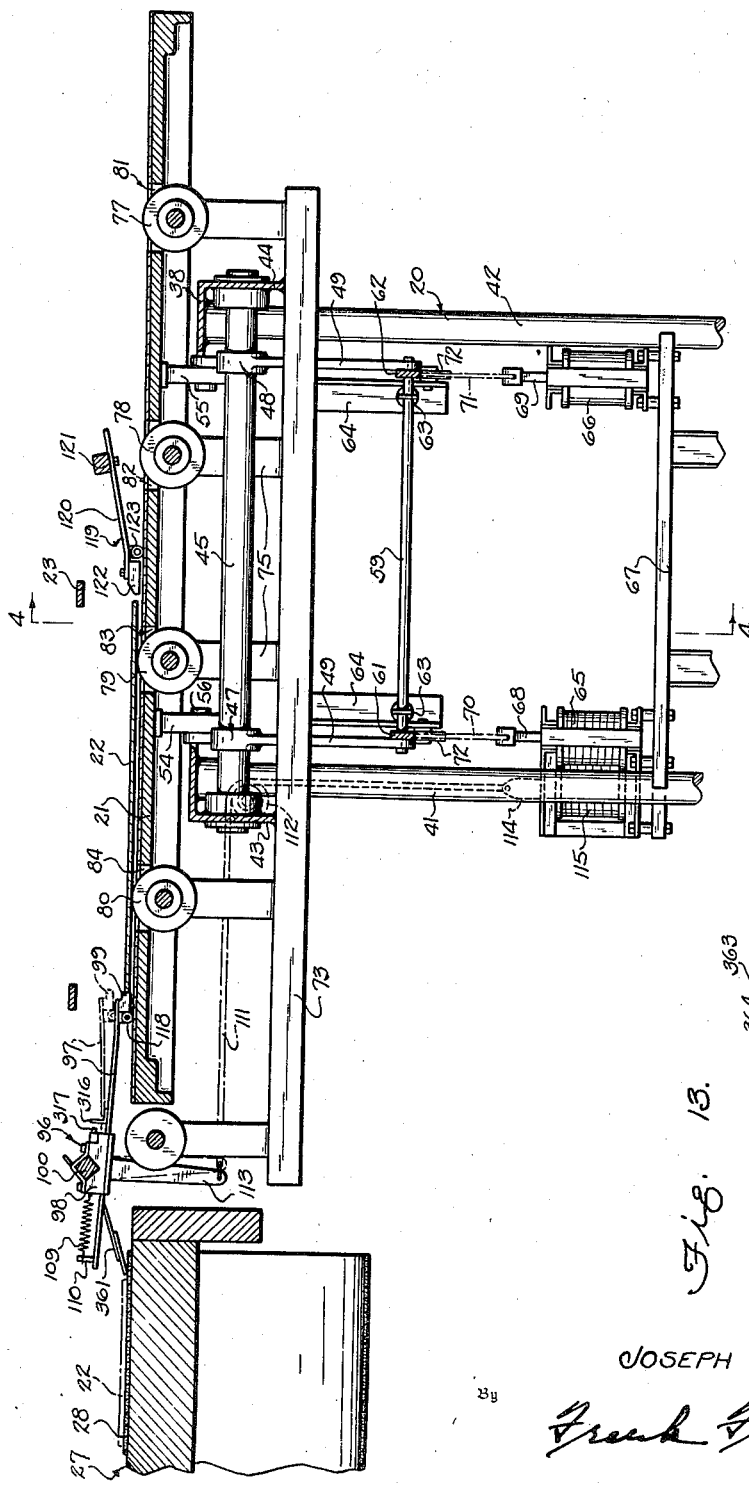
Fig. 3 is a vertical longitudinal section through the machine taken substantially on line 3—3 of Fig. 1.
Fig. 13 is a detail view of means for preventing rebound of the cut sheet after it has been delivered from the cutting machine onto a take-off conveyor.
Figure 4:
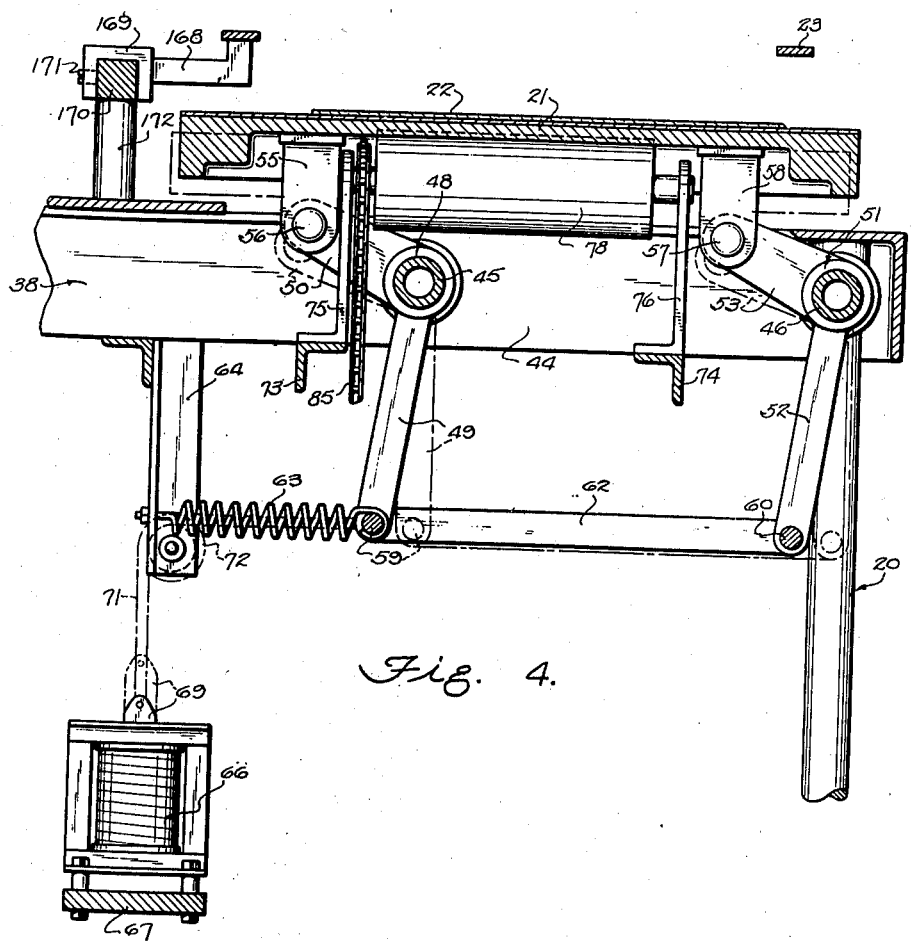
Fig. 4 is a vertical transverse section through the machine taken substantially on line 4—4 of Fig. 3.
Figure 7:
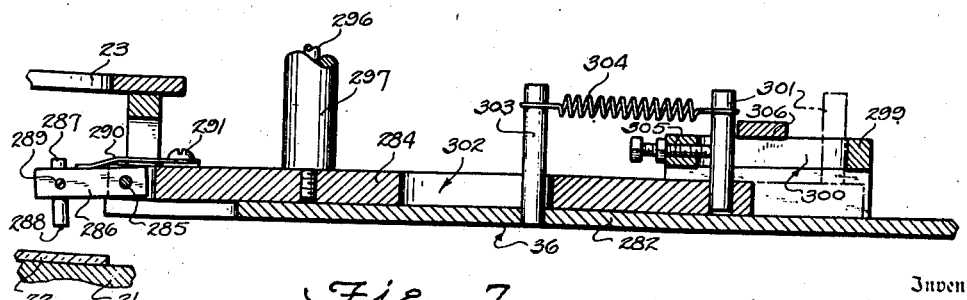
Fig. 7 is a detail vertical section taken substantially on line 7—7 of Fig. 1, showing one of the cutting tools for making the entering cuts.

As stated above, the cutting table comprises a supporting structure 20 and a vertically movable top 21 carried thereby. The supporting structure 20 includes a substantially rectangular horizontal frame 38 formed preferably of angle irons and supported adjacent its front end by the spaced vertical posts 39 and 40 (Fig. 2) and adjacent its rear end by similar posts 41 and 42 (Fig. 3). Extending longitudinally of the table and rotatably carried by the side members 43 and 44 of supporting frame 38 are the spaced parallel shafts 45 and 46 (Fig. 4). Fixed to the shaft 45 adjacent its opposite ends are the two bell-crank levers 47 and 48, each comprising a substantially vertical depending leg 49 and a substantially horizontal, relatively shorter leg 50. Keyed to the shaft 46, opposite bell-crank levers 47 and 48 on shaft 45, are similar bell-crank levers 51, each comprising a substantially vertical depending leg 52 and a substantially horizontal, relatively shorter leg 53.

The table top 21 is substantially rectangular in plan and has secured to the underside thereof spaced brackets 54 and 55 to which the substantially horizontal legs 50 of bell-crank levers 47 and 48 are pivoted as at 56, while the substantially horizontal legs 53 of bell-crank levers 51 are pivoted as at 57 to similar brackets 58 also carried upon the underside of the table top.

The depending legs 49 of bell-crank levers 47 and 48 are connected together at their lower ends by a horizontal rod 59 and a similar rod 60 connects the lower ends of the depending legs 52 of bell-crank levers 51. The parallel rods 59 and 60 are in turn connected together adjacent their opposite ends by horizontal links 61 and 62 so that all of the bell-crank levers will be caused to operate in unison. Fastened to the rod 59 adjacent each end thereof is one end of a tension spring 63 having its opposite end attached to a bracket 64 secured to the supporting frame 38. The tension springs 63 tend to normally urge the bell-crank levers in a clockwise direction to raise the table top 21, but they are not of sufficient strength to alone effect such raising.

The means for raising the table top 21 includes a pair of solenoids 65 and 66 carried upon a suitable platform 67 beneath the said table top. The vertical plungers 68 and 69 of solenoids 65 and 66 have attached to their upper ends chains 70 and 71 respectively which pass upwardly over sprockets 72 carried by brackets 64 and are connected to the rear ends of the horizontal links 61 and 62. From the above, it will be readily understood that upon energization of the solenoids 65 and 66 to draw the plungers 68 and 69 thereof downwardly, all of the bell-crank levers will be simultaneously rocked in a clockwise direction upon shafts 45 and 46 to effect the desired raising of the table. The raising of the table will be assisted by the action of the tension springs 63 which, as previously pointed out, always tend to raise the table but are not of sufficient strength to alone effect such raising. However, they do materially assist in the table raising by lessening the drawing force required to be exerted by the solenoids. When the various parts are in the full line position shown in Fig. 4, the table top 21 is elevated; whereas when in broken line position, the said table top is lowered. The table top is adapted to be maintained in elevated position by the solenoids 65 and 66 during the cutting of the glass sheet 22. Upon de-energization of the solenoids, the weight of the table top will cause it to be lowered against the action of springs 63.

Extending longitudinally of the cutting table and carried by the supporting frame 38 are the spaced parallel angle members 73 and 74 to which are secured a plurality of spaced pairs of vertical bearing straps 75 and 76 respectively. Rotatably carried at the upper ends of the bearing straps 75 and 76 are the conveyor rolls 77, 78, 79 and 80 which operate within transverse openings 81, 82, 83 and 84 respectively formed in the top of the table. All of the conveyor rolls 77 to 80 are preferably positively driven at all times and at a constant uniform speed by any suitable type of drive mechanism, such as the well known chain and sprocket drive 85 (Fig. 4).

During the feeding of the glass sheet 22 to be cut into desired cutting position upon the table, the table top 21 is in lowered position at which time the conveyor rolls 77 to 80 project upwardly slightly beyond the upper surface of said table top, as shown in Fig. 3, to receive the glass sheet thereon. The sheet is carried forwardly by the conveyor rolls to desired position upon the table where it is automatically brought to a stop as will be later explained. The table top is then automatically raised into cutting position by the energization of solenoids 65 and 66 whereupon the glass sheet will be transferred from the conveyor rolls to the stationary top of the table. The cutting of the sheet is then effected, after which the table top is lowered to again bring the sheet to rest upon the conveyor rolls whereupon the said rolls will discharge the sheet from the table onto the take-off conveyor 27, during which time another sheet to be cut is adapted to be delivered into cutting position upon the table.

*Sheet guiding and positioning means*

The means for effecting the accurate positioning of the glass sheet upon the cutting table and for maintaining the said sheet against accidental displacement during cutting will now be described in detail. As shown in Fig. 1, the top of the cutting table is relatively long, and the right hand end portion thereof designated *a* might be termed the receiving section while the left hand end portion indicated *b* can be called the cutting section. Thus, the conveyor rolls 77 and 78 are at the receiving end of the table and the conveyor rolls 79 and 80 at the cutting end thereof. The receiving section *a* of the table top is provided along the rear edge thereof with a plurality of guide rollers 86 mounted in fixed horizontal alignment with one another and freely rotatable upon pins 87, while arranged along the forward edge of both the receiving and cutting sections *a* and *b* of the table are a plurality of aligned freely rotatable guide rollers 88 similar to rollers 86. The glass sheet 22 to be cut is of course adapted to be received between and guided by the rollers 86 and 88 into cutting position.

Arranged adjacent the rear edge of the cutting section *b* of the table is a pair of guide rollers 89 and 90 which engage the rear edge of the sheet and are spring pressed into engagement therewith. Each roller 89 and 90 is mounted to freely rotate upon a vertical pin 91 carried at one end of a horizontal bell-crank lever 92, said lever being pivoted intermediate its ends as at 93 to a plate 94 suitably secured to the table. Fastened to the opposite end of the bell-crank lever 92 is a tension spring 95 which serves to normally urge the guide roller inwardly into engagement with the rear edge of the sheet, the inward movement of said roller being limited by a stop pin 95' carried by plate 94. With this arrangement, when the glass sheet 22 is initially placed upon the cutting table, the rear edge thereof is moved into engagement with guide rollers 86 and as the sheet is carried forwardly upon the conveyor rolls 77 to 80, it will be received between the guide rollers 88, which engage the forward edge of the sheet, and guide rollers 89 and 90 which engage the rear edge thereof.

There is also provided at the discharge end of the cutting table means, designated generally by the numeral 96, for limiting the forward movement of the glass sheet upon said table and for bringing the said sheet to a stop when it reaches a predetermined position thereon. The stop means 96 comprises a substantially horizontal strip 97 slidable through a block 98 and provided at its inner end with a stop plate 99 engageable by the forward edge of the glass sheet. The block 98 is mounted upon a transverse bar 100 having cylindrical end portions passing through horizontal bearings 101 and 102 carried by arms 103 and 104 provided at their inner ends with vertical bearings 105 and 106 mounted upon vertical pins 107 and 108 respectively carried by the table top.

The bar 100 is mounted for rocking movement in the bearings 101 and 102 and upon turning of the bar in a counter-clockwise direction (Fig. 3), the inner end of the strip 97 will be raised to lift the stop plate 99 upwardly out of the path of travel of the glass sheet, as shown in broken lines, thereby permitting the sheet to pass off of the table. However, when the stop plate 99 is in its lowered full line position, it is disposed in the path of travel of the glass sheet and upon engagement of the forward edge of the sheet with the said stop plate 99, the said sheet will be brought to a stop. The stop plate 99 is normally urged inwardly by a tension spring 109 fastened at one end to the block 98 and at its opposite end to a pin 110 on strip 97.

The means for lifting the stop plate 99 out of the path of travel of the glass sheet subsequent to the cutting operation to permit the removal of said sheet from the cutting table includes a chain 111 (Fig. 3) which passes over a sprocket 112 carried by the supporting frame 38. This chain is fastened at one end to a depending link 113 secured to one end of the bar 100 and at its opposite end to the vertically movable plunger 114 of a solenoid 115. The stop plate 99 is normally urged downwardly by compression springs 116 (Fig. 3) bearing at their lower ends against ears 117 fixed to the bar 100.

When the solenoid 115 is energized, the plunger 114 thereof will be drawn downwardly, thereby swinging the link 113 to the right (Fig. 3) to rock the bar 100 in a counter-clockwise direction and thereby effect the raising of the stop plate 99 out of engagement with the glass sheet. Upon de-energization of the solenoid, the stop plate 99 will be automatically lowered to sheet engaging position by the downward pressure of springs 116. It is preferred, in the operation of the machine, that the stop plate 99 be only momentarily raised at the completion of the cutting operation to permit the forward edge of the sheet to pass therebeneath, after which the said stop plate is lowered to rest upon the glass. To facilitate the passage of the sheet from the cutting table, relatively small rollers 118 may be carried by the strip 97 to ride along upon the upper surface of the glass sheet as the said sheet is delivered from the table.

When the forward edge of the glass sheet engages the stop plate 99, the sheet will move the strip 97 slightly outwardly against the action of the spring 109. The sheet will, however, be brought to a stop when the compression of the spring overcomes the force of the sheet. When this occurs, there may be a slight rebound of the sheet and for preventing undue rebound of the sheet when it engages the stop means 96, there is provided at the opposite end of the table the stop means 119. The stop means 119 is somewhat similar to stop means 96 and also includes a strip 120 adjustably carried by the transverse supporting bar 121 and provided at its forward end with a stop plate 122 and also with the sheet engaging rollers 123. The transverse bar 121 is provided at its opposite ends with cylindrical portions 124 and 125 rotatably mounted in bearing brackets 126 and 127 respectively carried by the table top.

As the glass sheet is moved forwardly upon the cutting table, the said sheet initially engages the rollers 123, causing the stop plate 122 to be lifted upwardly whereby to permit the travel of the sheet therebeneath and during the passage of the sheet into cutting position, the rollers 123 ride along upon the upper surface of said sheet. As soon as the rear edge of the sheet passes beyond the stop plate 122, the said plate falls downwardly to prevent or limit rearward movement of the sheet when it engages the stop means 96 at the forward end of the table. It will be thus clearly seen that means is provided for accurately positioning the glass sheet upon the cutting table automatically and without any assistance from the operator.

In order to clamp the glass sheet 22 firmly upon the table to prevent accidental displacement thereof during cutting, clamping members are provided to engage the front and rear edges of the sheet just prior to or simultaneous with the raising of the table to cutting position. To this end, there are positioned to engage the rear edge 32 of the sheet a pair of spaced clamping members 128 (only one being shown in Fig. 1), while the clamping members engaging the forward edge 33 of the sheet are designated 129 and 130. The clamping members 128 are mounted in fixed position and each comprises a block 131 engaging the rear edge of the sheet and being carried by a horizontal bolt 132 which passes through a bracket 133 carried by the table and is secured in place by nuts 134. By proper adjustment of the nuts 134, the clamping block 131 can be moved forwardly or rearwardly to the desired position.

The clamping members 129 and 130 are mounted for horizontal movement toward and away from the glass sheet and upon engagement with the forward edge of the sheet are adapted to urge the rear edge thereof firmly against the clamping blocks 131. Each of the movable clamping members 129 and 130 comprises a clamping block 135 carried at the inner end of a horizontal bolt 136 which passes loosely through a sleeve 137 and has threaded upon its outer end a nut 138. Encircling the bolt 136 is a compression spring 139 bearing at its forward end against the clamping block 135 and at its opposite end against the sleeve 137. The spring 139 serves to yieldably urge the clamping block forwardly and this forward movement is limited by the nut 138.

The sleeves 137 of clamping members 129 and 130 are formed integral with brackets 140 and 141 respectively, and these brackets are pivotally mounted at their outer ends upon horizontally aligned stub shafts 142 and 143 carried at the upper ends of vertical arms 144 and 145, said arms being connected together by a horizontal shaft 146 to form a substantially U-shaped yoke 147. The shaft 146 is journaled for rocking movement in bearing blocks 148 and 149 mounted upon the front member 150 of the supporting frame 38. Also carried by the front member 150 of supporting frame 38 is a vertical plate 151 provided at its lower end with horizontally spaced ears 152 carrying a horizontal pin 153 upon which is mounted a vertically disposed rocker lever 154. The rocker lever 154 is mounted intermediate its ends upon the pin 153 and comprises the upwardly and downwardly extending portions 155 and 156 arranged at an obtuse angle relative to one another (Fig. 5). The lower end 156 of rocker lever 154 is formed with a slot 157 through which passes a bolt 158 to which is pivoted one end of a link 159, the opposite end of which is pivoted upon the rod 60. The upper end 155 of said rocker lever is received between the bifurcated lower end 160 of a block 161 loosely mounted at its upper end upon the shaft 146. The rocker lever 154 is secured to the block 161 by a bolt 162 passing through a vertical slot 163 in the lower end 160 of said block 161.

Fixed to the yoke 147, by welding or the like, is a vertical plate 164 provided with an arcuate slot 165 through which passes a bolt 166 carrying nut 167 and by means of which the said plate 164 is secured to the block 161. By loosening the nut 167 on bolt 166, the yoke 147 can be rocked in bearing blocks 148 and 149 to move the arms 144 and 145 and clamping members 129 and 130 carried thereby either inwardly or outwardly. This adjustment is provided to take care of different sized sheets of glass which may be cut.

Upon energization of solenoids 65 and 66 to effect the raising of the table top 21, the rocker lever 154 will be rocked in a clockwise direction upon its pivot 153 (Fig. 5) through the link connection 159, whereupon the upper end of said rocker lever will be moved outwardly to effect turning of the shaft 146 in a counter-clockwise direction. This will cause the clamping members 129 and 130 to be moved inwardly into engagement with the forward edge of the glass sheet, and these members will of course serve to urge the sheet rearwardly into contact with clamping blocks 131. Thus, during the raising of the table and also during the time the table is in elevated position, the glass sheet will be firmly clamped in place between the fixed and movable clamping members.

*Cutting mechanism*

The template 23 for supporting and guiding the cutting unit 24 preferably consists of a relatively narrow track of the desired shape and size supported horizontally above the cutting table by brackets 168 (Fig. 4), said brackets having inverted U-shaped ends 169 which fit over a horizontal supporting bar 170 and are secured thereto by set screws or the like 171. The bar 170 is mounted in spaced relation above the cutting table upon posts 172.

As shown in Fig. 1, the cutting unit 24 is carried at the outer end of a horizontal supporting arm 173 hinged at its inner end as at 174 to a second horizontal arm 175 which is pivotally mounted at its inner end as at 176 to a bracket 177 secured upon a platform 178 carried by the supporting frame 38.

With reference particularly to Figs. 1, 10, 11 and 12, the cutting unit 24 comprises a housing 179 provided with a removable top plate 180 secured in place by screws or the like 181. Fastened to the top plate 180 of the housing by screws or the like is a vertical bushing 182 which is rotatably mounted in a bearing sleeve 183 formed at the outer end of the horizontal supporting arm 173, said bushing 182 projecting above said bearing sleeve and having threaded thereon a nut 184 which serves to secure the cutting unit to said supporting arm.

Carried by the housing 179 at one side thereof is a pair of spaced guide wheels 185 and 186 freely rotatable upon vertical pins 187, while a pair of similar guide wheels 188 are carried at the opposite side of said housing upon vertical pins 189. The housing 179 is slidably received between a pair of horizontal parallel rods 190 and 191 carried at one end by the cutter head 192 and connected together at their opposite ends by a cross strap 193. The inner sides of the rods 190 and 191 are cut away as indicated at 194 and 195 (Fig. 11) to provide grooved tracks for the guide wheels 185—186 and 188 respectively.

The cutter head 192 is hollow and is formed at its lower end with a dove-tailed rib 196 (Fig. 11) carrying a horizontal plate 197 provided in its upper surface with an undercut groove 198 receiving the rib 196 therein. The horizontal plate 197 is provided at its inner end with a well 199 in which is received a cylindrical cutter holder 200, said cutter holder having a depending reduced portion 201 projecting through an opening in the bottom of said well and carrying the rotatable steel cutting wheel 25.

The side wall of the well 199 is provided with aligned vertical slots 202 and carried by the cutter holder 200 are horizontal pins 203 which project outwardly through said slots. Carried at the outer end of the plate 197, remote from well 199, is a vertical L-shaped lever 204, said lever being pivoted intermediate its ends to the plate 197 as at 205 and the horizontal portion 206 thereof being bifurcated at its inner end to provide spaced legs 207 which straddle the well 199 and engage the pins 203.

The cutter head 192 is also provided with a vertical opening 208 in which is mounted a vertical pressure pin 209, said pin projecting downwardly through an opening 210 in the plate 197 and engaging the horizontal portion 206 of lever 204. Threaded within the upper end of the opening 208 is a nut 211, while formed upon the pressure pin 209 adjacent the lower end thereof is an annular flange 212. Arranged within the opening 208 and encircling pressure pin 209 are the two concentric compression springs 213 which bear at their upper ends against the nut 211 and at their lower ends against the flange 212, thereby acting to normally urge the pressure pin 209 downwardly to engage the horizontal portion 206 of lever 204. With this construction, the cutting wheel 25 will be yieldably maintained in engagement with the glass sheet 22 while the pressure of the cutting wheel upon the glass can be regulated by proper adjustment of the nut 211 to control the compression of the springs 213. The plate 197 may be adjusted horizontally relative to cutter head 192 to vary the position of the cutting wheel 25 by means of a set screw 214 which passes through a boss 215 on the plate 197 and engages the cutter head 192.

Carried by the cutter head 192 is a freely rotatable guide roller 216 mounted upon a vertical stub shaft 217 and adapted to engage one vertical side edge of the template 23. Carried by the housing 179 and adapted to engage the opposite vertical side edge of the template are the spaced guide rollers 218 and 219, the guide roller 216 engaging the template at a point intermediate the two guide rollers 218 and 219. The guide rollers 218 and 219 are positively driven and to this end are carried at the lower ends of vertical drive shafts 220 and 221 respectively rotatably mounted in the bottom of housing 179. Keyed to the upper ends of the shafts 220 and 221, within housing 179, are gears 222 and 223 respectively.

The guide rollers 218 and 219 are driven through a train of gears arranged in the housing 179 and including a drive gear 224 and an intermediate gear 225. The intermediate gear 225 is rotatable upon a vertical screw 226 threaded in the top 180 of the housing and is located between the gears 222 and 223 as clearly shown in Fig. 12. The drive gear 224 is keyed to the lower end of a vertical stub shaft 227 secured at its upper end within a vertical bore 228 formed in a cylindrical bearing 229 which is arranged within the bushing 182, said bearing being keyed to the upper end of the stub shaft 227 by screws or the like 230.

Also received within the bore 228 in bearing 229 is one end of a flexible shaft 231 secured to the said bearing by set screws or the like 232. The flexible shaft 231 is connected at its opposite end with the motor 29 which may be suspended a suitable distance above the cutting table or mounted in any other desired manner. Upon operation of the motor 29, the flexible shaft 231 turning bearing 229 will effect rotation of drive gear 224, and this rotary movement will be transmitted to the guide rollers 218 and 219 through the gears 225, 222 and 223 respectively. The positive rotation of the guide rollers 218 and 219 will cause the cutting unit 24 to be driven around the template 23.

It is of course essential, in the operation of the machine, that the cutting edge of the rotatable steel cutting wheel 25 be always maintained tangent to the line of cut if a satisfactory cut is to be made, and the same is equally true when using a cutting diamond instead of a rotatable steel wheel. The provision of the guide rollers 216, 218 and 219, together with the fact that the cutting wheel is prevented from rotating about an axis extending perpendicular to the glass sheet, serve to maintain the cutting edge of the wheel tangent to the line of cut as the cutting unit is propelled around the template.

The guide rollers 216, 218 and 219 are yieldably maintained in engagement with the template 23 by the action of tension springs 233 and 234 connected at one end to a transverse strip 235 carried at the outer end of housing 179 and at their opposite ends to screws 236 and 237 respectively carried by the cutter head 192. These springs serve to draw the housing 179 and cutter head 192 toward one another to maintain the guide rollers carried thereby in yieldable engagement with opposite side edges of the template.

Stop means for cutting unit

As brought out above, when the motor 29 is placed in operation, the cutting unit 24 will be driven around the track template 23, with the cutting wheel 25 scoring the glass sheet 22 along the line 26 in Fig. 1. It is preferred that the cutting unit be positively driven through only a portion of its cutting cycle and then permitted to coast the balance of its cycle. In order to reduce the shock of sudden stopping and the tendency of the cutting unit to rebound, the invention contemplates the provision of means for first slowing down the speed of the cutting unit as it approaches the end of its cutting cycle and then bringing the same to a stop and maintaining it in such position until it is desired to repeat the cutting operation.

Figure 8:
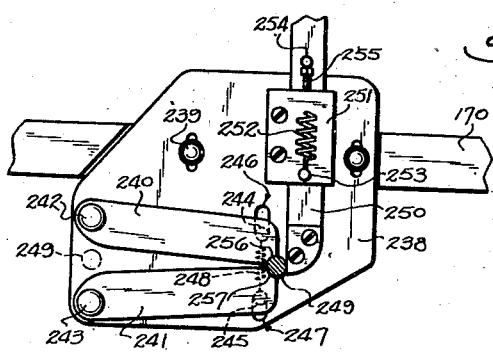
Fig. 8 is a plan view of the means for bringing the cutting unit to a stop at the completion of its cutting cycle.
Figure 9:
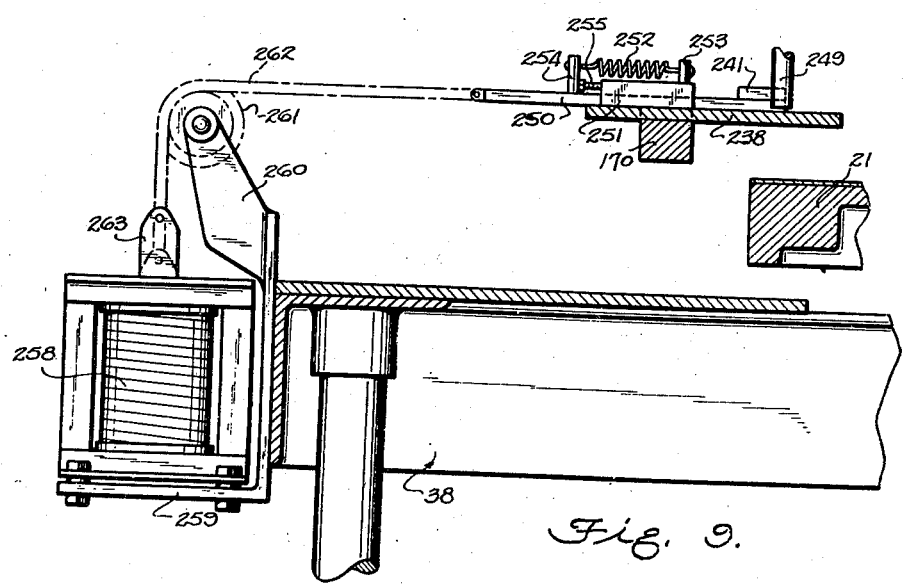
Fig. 9 is a detail vertical section taken substantially on line 9—9 of Fig. 1 and showing the cutting unit stop means.
Figure 10:
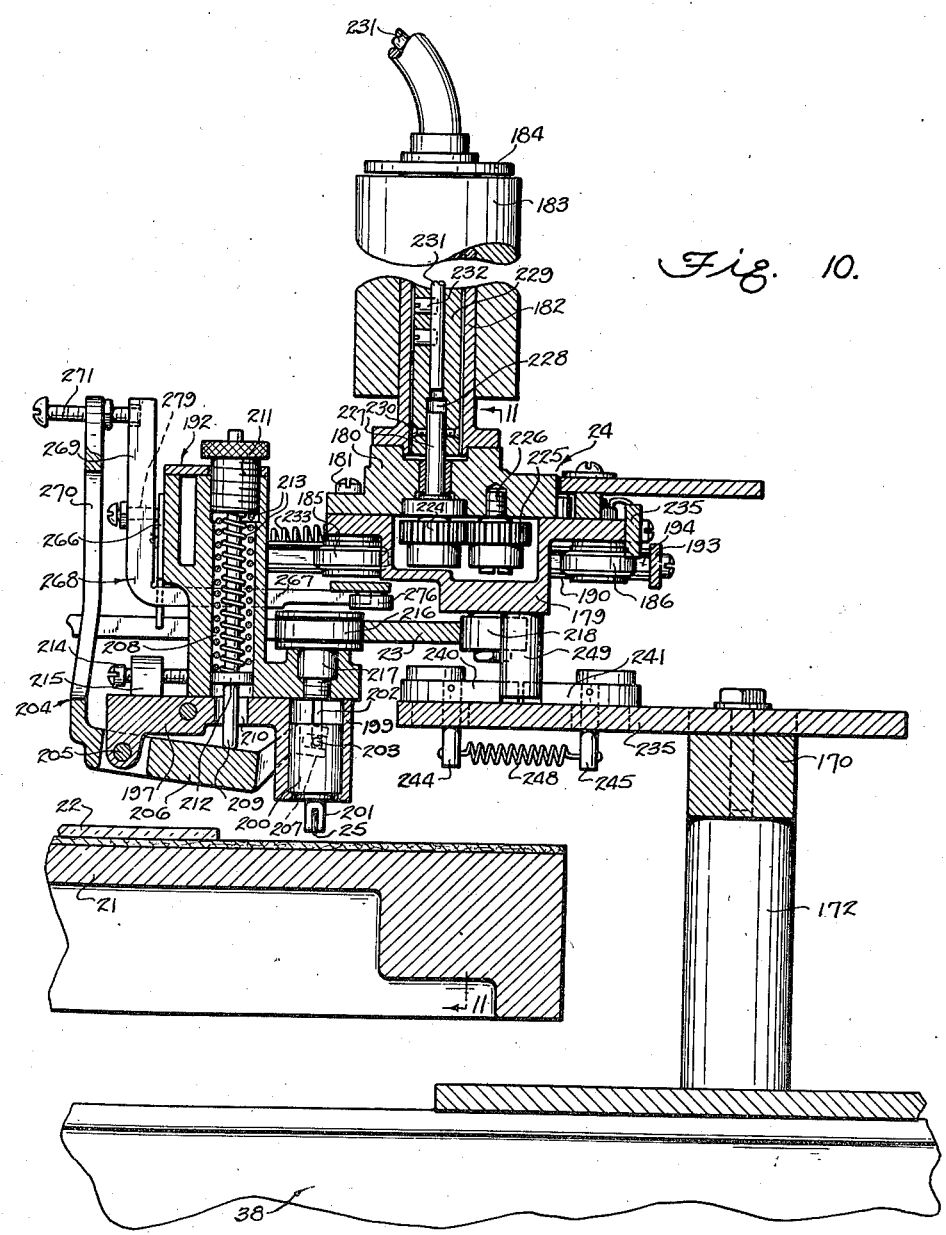
Fig. 10 is a vertical section through the cutting unit taken substantially on line 10—10 of Fig. 1.
Figure 11:
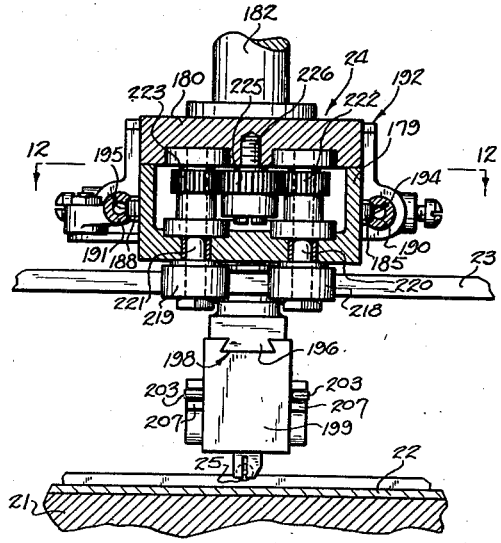
Fig. 11 is a vertical section through the cutting unit taken substantially on line 11—11 of Fig. 10.
Figure 12:
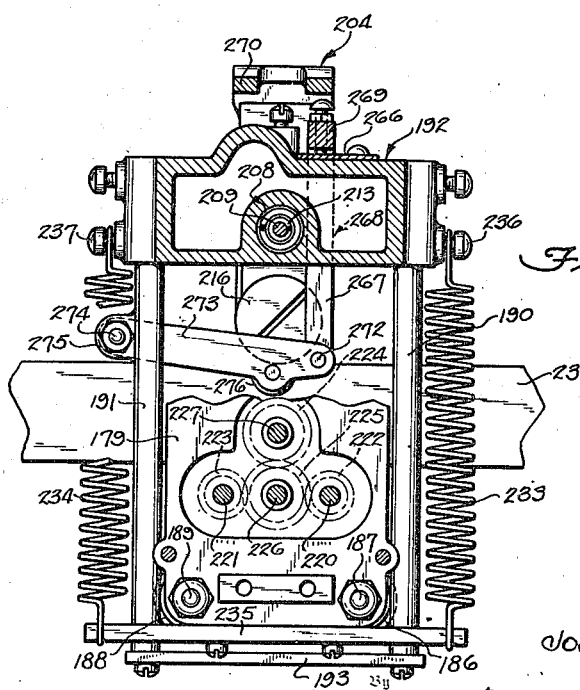
Fig. 12 is a horizontal section through the cutting unit taken substantially on line 12—12 of Fig. 11.

The cutting unit stop means is best illustrated in Figs. 8, 9 and 10 and comprises a horizontal plate 238 arranged at the back of the cutting table intermediate the ends thereof and secured to the longitudinally extending bar 170 by bolts or the like 239. Carried by the plate 238 is a pair of opposed levers 240 and 241 pivoted thereto as at 242 and 243 respectively. Carried at the free ends of the levers 240 and 241 are depending pins 244 and 245 respectively which pass through slots 246 and 247 in plate 238 and are connected by a tension spring 248 which functions to normally draw the levers 240 and 241 together.

Carried by and depending from the housing 179 of cutting unit 24 is a stop pin 249 and as the cutting unit approaches the end of its cutting cycle, the stop pin passes between the levers 240 and 241 as indicated by the broken lines in Fig. 8, whereupon the frictional engagement of the said levers with the said pin will cause a slowing down of the cutting unit. Although this serves to cut down the speed of travel of the cutting unit, the said unit will, however, not be brought to a stop until the stop pin 249 passes beyond the said levers 240 and 241 and engages the inner end of a stop bar 250 extending transversely of the cutting table.

The stop bar 250 is horizontally slidable through a guide block 251 carried by plate 238 and is normally maintained in the path of travel of the stop pin 249 by a spring 252 fastened at one end to a post 253 on block 251 and at its opposite end to a post 254 carried by stop bar 250. The inward movement of the stop bar is limited by a horizontal screw 255 threaded in block 251 and engageable by the post 254. By proper adjustment of the screw 255, the inward movement of the stop bar can be accurately regulated. The spring 252 serves to normally maintain the stop bar 250 in the position indicated in Fig. 8, so that after the pin 249 on the cutting unit passes from between the levers 240 and 241, it will engage the inner end of said bar as shown by the full lines in Fig. 8 and bring the slowly moving cutting unit to a stop. The levers 240 and 241 are provided at their free ends with substantially semi-circular notches 256 and 257 respectively in which the stop pin 249 is received when the cutting unit is brought to a stop and by means of which rebound of said cutting unit is prevented.

It will be evident from the above that the stop bar 250 not only acts to bring the cutting unit to a stop but also prevents further movement of the unit until the said bar is withdrawn from out of the path of travel of the stop pin 249. This is automatically accomplished at the proper time in the operation of the machine by a solenoid 258 (Fig. 9) supported by an angle bracket 259 secured to the supporting frame 38. Carried at the upper end 260 of bracket 259 is a sprocket 261 about which is trained a chain 262 connected at one end to the outer end of a stop bar 250 and at its opposite end to the vertical plunger 263 of solenoid 258.

When the solenoid 258 is energized, the plunger 263 thereof will be moved downwardly to draw the stop bar 250 out of engagement with the stop pin 249 on the cutting unit, thereby permitting travel of the unit around the template 23. Upon deenergization of the solenoid 258, the tension of the spring 252 will be sufficient to again move the stop bar 250 inwardly so that it will be in position to stop the cutting unit upon the completion of its cutting cycle. The operation of the solenoid 258 is controlled by a switch 264 (Fig. 1) secured to bar 170 and adapted to be actuated by a member 265 carried by the cutter supporting arm 173 when the cutting unit 24 is in substantially the position indicated in broken lines in Fig. 1. More specifically, the member 265 serves to open the switch 264 to break the circuit through the solenoid 258 and thereby permit the stop bar 250 to be returned to operative position so that it will stop the cutting unit when said unit reaches the end of its cutting cycle. The opening of the switch 264 is also adapted to shut off the motor 29 so that the cutting unit will coast the balance of its cutting cycle.

Cutting tool lifting means

For the purpose of preventing chipping or spalling of the rear edge 32 of the glass sheet 22 as the cutting wheel 25 passes onto the sheet at the beginning of the cutting operation and from said sheet at the completion of the cutting operation, as well as for preventing injury to the cutting wheel, means is provided for lifting the cutting wheel and placing it upon the sheet slightly inwardly of the rear edge 32 thereof at the beginning of the cutting operation and for also lifting the cutting wheel from the sheet just before it reaches the edge 32 at the completion of the cutting operation. This raising and lowering of the cutting wheel is effected by the cams 30 and 31 secured upon the top of the template 23 (Fig. 1) in conjunction with cooperating means carried by the cutter head 192.

Secured to the cutter head 192 is a vertical plate 266 (Fig. 10) provided at its lower end with a guide slot through which is slidably received the horizontal portion 267 of an L-shaped bracket 268. The vertical portion 269 of said bracket is disposed inwardly of and substantially parallel with the vertical portion 270 of the L-shaped lever 204. Passing through the upper end of lever 204 is a set screw 271 having its inner end engaging within a recess in the upper end of L-shaped bracket 268. Upon horizontal sliding movement of the L-shaped bracket 268 through guide plate 266, the L-shaped lever 204 is adapted to be rocked about its pivot 205 to effect the raising or lowering of the cutting wheel 25. The horizontal portion 267 of L-shaped bracket 268 is pivoted at its inner end as at 272 (Fig. 12) to one end of a horizontal link 273 pivotally mounted at its outer end as at 274 to a bracket 275 carried by horizontal rod 191. Carried by the link 273 is a roller 276 which is adapted to engage the inner edges of the cams 30 and 31 as the cutting unit travels around the template.

When the motor 29 is placed in operation to start the cutting unit 24 around the template, the roller 276 on the cutting unit will engage the inner edge portion 277 of the cam 30 (Fig. 6). As the roller 276 rides along the high portion 277 of cam 30, the link 273 will be swung upon its pivot 274 to move the L-shaped bracket 268 outwardly, and this movement of the bracket will cause the L-shaped lever 204 to be rocked in a counter-clockwise direction (Fig. 10) to effect the raising of the cutting wheel 25. However, upon continued movement of the cutting unit and when the roller 276 passes onto the lower inner edge portion 278 of cam 30, as indicated in broken lines in Fig. 10, the compression springs 213, acting through the pressure pin 209 upon the horizontal portion 206 of L-shaped lever 204, will rock said lever in a clockwise direction to move the bracket 268 inwardly and the cutting wheel 25 downwardly into engagement with the glass sheet. The inward movement of the L-shaped bracket 268 is controlled by a set screw 279. In this way, the cutting wheel 25 will be lifted above the level of the glass sheet 22 just before it reaches the rear edge 32 of said sheet and will then be lowered upon the sheet slightly inwardly of the rear edge thereof. The cutting wheel 25 is also raised in the same manner by the cam 31 just before it reaches the rear edge 32 of the sheet at the completion of the cutting operation, and after it passes beyond the rear edge of said sheet it is again lowered.

Cutters for making entering cuts

In order to facilitate the subsequent breaking of the scored sheets of glass after they have been discharged from the cutting machine, there are provided the cutters 36 and 37 for making so-called entering cuts or vents which, as shown in Fig. 15, extend inwardly from the forward edge 33 of the glass sheet to the score line 26 made by the cutting unit 24. The cutters 36 and 37 are adapted to be automatically actuated by movement of the cutting unit and more particularly by means of a cam 280 (Fig. 1) carried thereby and provided with a curved outer edge 281.

With reference particularly to Figs. 1, 2, 5 and 7, each cutter assembly 36 and 37 comprises an elongated supporting plate 282 extending forwardly from the cutting table 21 and carried by a supporting frame 283. Slidably mounted upon the plate 282 and extending longitudinally thereof is a slide strip 284 to the inner end of which is pivoted as at 285 a block 286. Mounted in the block 286 is a cutting ferrule 287 carrying at its lower end the cutting diamond or other cutting tool 288, said ferrule being secured in said block by a set screw 289. The block 286 is normally urged downwardly to maintain the cutting diamond in yieldable engagement with the glass sheet during cutting, by means of a leaf spring 290 secured to the slide strip 284 by a screw 291. To facilitate horizontal sliding movement of the strip 284 upon plate 282, there are carried by said plate the two pairs of freely rotatable guide rollers 292 and 293 (Fig. 1) between which the slide strip 284 is received. The opposite side edges of said slide strip may be grooved as at 294 and 295 (Fig. 2) to form tracks for receiving the rollers 292 and 293 respectively.

Also carried by the slide strip 284, adjacent the inner end thereof, is a vertical bolt 296 surrounded by a sleeve 297 and carried at the upper end of said bolt is a freely rotatable roller 298 which is adapted to be engaged by the cam 280 carried by cutting unit 24. Upon engagement of cam 280 with roller 298, the slide strip 284 will be forced outwardly to move the cutting diamond 288 over the glass sheet to score the same and thereby make the respective entering cut 34 or 35.

The slide strip 284 is slidably received at its outer end within a housing 299 carried upon the plate 282. The top of the housing is formed with a longitudinal slot 300 through which projects a vertical post 301 carried at the outer end of said slide strip. The slide strip 284 is also formed inwardly of post 301 with a longitudinal slot 302 and projecting through this slot is a vertical post 303 carried by plate 282. Extending between and fastened to the upper ends of posts 301 and 303 is a tension spring 304 which acts to normally urge the slide strip 284 and cutting tool 288 carried thereby forwardly into cutting position. The forward movement of the slide strip and cutting tool is regulated by a stop screw 305 passing horizontally through the housing 299.

As brought out above, during the cutting operation, the slide strip 284 of each cutter assembly 36 and 37 is adapted to be forced outwardly by the cam 280 on cutting unit 24 to effect the scoring of the glass sheet by the diamond 288 carried thereby. After the entering cut has been made, the slide strip 284 is adapted to be maintained in its outer or retracted position until the cutting unit completes its cutting cycle. The locking of slide strip 284 in retracted position is accomplished by the provision of a transverse catch 306 slidable between the top of the housing 299 and a plate 307 secured in spaced relation to said top. The forward edge of the catch is beveled as at 308 (Fig. 1) and is normally urged inwardly by a spring 309 secured at one end to a vertical pin 310, passing through the outer end of said catch, and at its opposite end to a screw 311 carried by plate 307. The action of the spring 309 serves to normally maintain the inner beveled end 308 of the catch in the path of movement of the post 301 carried by slide strip 284. However, when said slide strip is moved outwardly, the post 301 will force the catch 306 laterally so that the said post will pass behind the catch. Then, as the catch is moved inwardly in front of the post 301 by the spring 309, the post will be held against forward movement. As stated, upon outward movement of the slide strip 284, the respective cutting diamond 288 will be caused to move over and in contact with the glass sheet to form an entering cut. The slide strip 284 and cutting tool 288 are then locked in retracted position by the catch 306 until the cutting unit 24 has completed its cutting cycle and the cutting table 21 is lowered.

The lowering of the cutting table is adapted to effect the automatic release of the posts 301 from behind the catches 306 so that the slide strips 284 and cutting diamonds 288 carried thereby will again be moved inwardly to cutting position by the action of springs 304. To this end, there are pivotally carried by the horizontal stub shafts 142 and 143 the cam fingers 312 and 313 (Figs. 1 and 2), the outer end 314 of each finger being received between the housing 299 and the lower end of the vertical pin 310 carried by the respective catch 306. Each cam finger 312 and 313 is supported at its outer end upon a plate 315 carried upon the underside of the respective housing 299. The cam fingers are so shaped that when the solenoids 65 and 66 are de-energized to permit lowering of the cutting table 21 and outward movement of the clamping blocks 135 to the broken line position indicated in Fig. 5, the said cam fingers will force the pins 310 laterally against the action of springs 309. This movement of the pins will serve to withdraw the catches 306 and permit the posts 301 to move forwardly in slots 300 to return the cutting diamonds 288 to cutting position.

*Operation and electrical wiring of machine*

In the operation of the machine, the glass sheet 22 to be cut is first placed upon the receiving end *a* of the cutting table and moved forwardly thereover into cutting position beneath the template 23. When the glass sheet is delivered onto the cutting table, the top 21 thereof is in lowered position as in Fig. 3 so that the glass sheet is received and supported upon the conveyor rollers 77 to 80. At this time, the cutting unit 24 is in starting position at the back of the table as shown in full lines in Fig. 1; the sheet clamping blocks 135 are in retracted broken line position as indicated in Fig. 5; and the cutters 36 and 37 for making the entering cuts are in forward position above the cutting table as also shown in Fig. 5.

As soon as the glass sheet engages the conveyor rollers 77 and 78, the said rollers will serve to carry the sheet forwardly until the forward edge thereof engages the stop plate 99 of the sheet stop means 96 which, as brought out above, limits the forward movement of the sheet upon the table. When the sheet engages the stop means 96, the strip 97 thereof will be forced slightly outwardly against the action of the spring 109 to cause the solenoid 258 to be energized to withdraw the stop bar 250 from the path of travel of pin 249 carried by the cutting unit 24 to permit movement of the said unit. To this end, there are provided the two contacts 316 and 317 carried by the strip 97 and block 98 respectively of the sheet stop means 96. Substantially simultaneously, the solenoids 65 and 66 will be energized to raise the cutting table to transfer the glass sheet from the conveyor rollers to the table top 21. When the table is raised, the clamping blocks 135 will be automatically moved inwardly through the link connection 159 and lever arm 154 to clamp the glass sheet against the stationary clamping blocks 131. At substantially the same time, a circuit will be completed through the motor 39 to start the travel of the cutting unit 24 around the template 23. The operation of the various parts of the machine in the proper sequence will be more clearly understood upon reference to the electrical wiring diagram in Fig. 14.

When the forward edge of the glass sheet 22 engages the strip 97 of stop means 96, moving it against the action of spring 109, the contacts 316 and 317 will be momentarily engaged with one another and when so engaged a holding circuit is adapted to be completed through the two electromagnets 318 and 319 to close the operating circuits for the various parts of the machine. More specifically, when the contacts 316 and 317 engage one another, a circuit will be completed from the positive main line 320 through wire 321, electromagnet 318, wires 322 and 323, contacts 316 and 317 and wire 324 to the negative main line 325. The completion of the circuit through the electromagnet 318 will cause the energization thereof and draw the bar 326 thereof upwardly to move the contacts 327 and 328 carried thereby into engagement with contacts 329 and 330 respectively. When this occurs, the current will enter through wire 321 and will pass through the electromagnet 318, contacts 330, 328, wire 331, switch 264, and wire 332 to the negative main line. The energization of electromagnet 318 will maintain the contacts 327, 329 and 328, 330 in engagement with one another even when the contact 316 is moved out of engagement with contact 317.

When the contacts 316 and 317 engage one another, a circuit will also be completed through the electromagnet 319, at which time the current passes from the positive line through wire 333 to electromagnet 319 and thence through wire 334, wire 323, contacts 316, 317, and wire 324 to the negative main line. The energization of electromagnet 319 will cause the bar 335 thereof to be drawn upwardly to bring the contacts 336 and 337 carried thereby into engagement with contacts 338 and 339 respectively. When this occurs, the electric current will enter through wire 333, pass through electromagnet 319, contacts 339, 337, and wire 340 to a fixed contact 341 carried by the bracket 177 supporting the cutting unit 24 (see Fig. 1). The contact 341 is adapted to engage a contact plate 342 carried upon the cylindrical bearing portion 343 formed at the inner end of the horizontal supporting arm 175 for the cutting unit 24. The current passes from the contact 341 through the contact plate 342 and to the negative main line through wire 344.

When the electromagnets 318 and 319 are energized, the various parts of the machine are placed in operation. For instance, when electromagnet 318 is energized to bring contacts 327 and 328 into engagement with contacts 329 and 330, electric current is caused to pass from the positive main line 320 to the electromagnet 258 through wire 345, and thence through wire 346, contacts 329, 327 and wire 347 to the negative main line 325. The energization of the solenoid 258 will serve to withdraw the stop bar 250 from in front of the pin 249 on the cutting unit so as to permit movement of the said unit upon operation of the motor 29 which takes place substantially simultaneously with the removal of said stop bar. Thus, current will pass to the motor 29 through wire 348 and from the motor through wire 349, contacts 329, 327 and wire 347.

At substantially the same time the solenoid 258 is energized and the circuit through the motor 29 completed, the solenoids 65 and 66 are energized to effect the raising of the table 21 to cutting position. This is effected upon energization of the electromagnet 319, at which time current will enter from the positive main line 320 through wire 349, pass through solenoids 65 and 66 to wire 350, thence through contacts 336, 338 and to the negative main line 325 through wire 351. At this time, it will be seen that the table 21 has been raised, the cutter stop 250 has been released, and the cutting unit 24 started to move around the template 23. As explained above, when the table is raised, the glass sheet will be automatically clamped in position thereon between the fixed and movable clamping blocks 131 and 135 respectively and held in clamped position until the cutting operation is completed and the table lowered.

The driving of the cutting unit will continue until the member 265 carried by the horizontal supporting arm 173 for the cutting unit opens the switch 264 whereupon the circuit through the motor 29 will be broken so that power to the cutting unit will be discontinued. The power to the motor 29 is shut off when the cutting unit reaches substantially the position indicated by the broken lines in Fig. 1, so that the unit is adapted to coast the balance of its cutting cycle. The opening of the switch 264 will break the circuit through the electromagnet 318, causing a lowering of the bar 326 to move contacts 327 and 328 away from contacts 329 and 330 respectively. The breaking of this circuit will also break the circuit through the solenoid 258 to permit the cutter stop bar 250 to be returned to operative position by the spring 252. As the cutting unit reaches the end of its cutting cycle, the speed of travel thereof will first be slowed down by frictional contact of the stop pin 249 with the levers 240 and 241 of the cutter stop means, after which the said unit will be brought to a stop by engagement of the pin 249 with the stop bar 250.

As also explained above, at the beginning of the cutting operation, the cutting wheel 25 is raised by the cam 30 and placed upon the glass sheet slightly inwardly of the rear edge 32 thereof and also raised by the cam 31 just before it reaches said edge at the completion of the cutting operation. Likewise, upon travel of the cutting unit 24 around the template, the outer curved edge 281 of cam 280 will engage the rollers 298 of the cutters 36 and 37 and move the cutting diamonds 288 outwardly so that they will make the entering cuts 34 and 35 shown in Fig. 15. These cutters will be locked in outer or retracted position by the catches 306 until the cutting unit has completed its cutting cycle and the table lowered.

After the glass sheet 22 has been properly scored by the cutting wheel 25, the table raising solenoids 65 and 66 are deenergized to permit lowering of the table, and this is accomplished by breaking the circuit through the electromagnet 319. The breaking of the circuit through the electromagnet 319 is effected by causing the fixed contact 341 on bracket 177 to pass momentarily out of engagement with the contact plate 342 as the bearing 343 moves in the direction indicated by the arrow. This will cause a lowering of the plate 335 to move contacts 336 and 337 out of engagement with contacts 338 and 339 respectively. Upon lowering of the cutting table, the glass sheet will again be transferred to the conveyor rollers 79 and 80 and will be delivered thereby onto the take-off conveyor 27. The lowering of the table will also move the clamping block 135 outwardly to release the glass sheet and to also actuate the catches 306 so that the cutting diamonds 288 will be returned by the springs 304 to operative position for the next cut.

Substantially simultaneously with the lowering of the table, a fixed contact 352, also carried by the supporting bracket 177, will momentarily engage a contact plate 353 on the cylindrical bearing portion 343. The engagement of contact 352 with contact plate 353 will complete a circuit through the solenoid 115 to cause the energization thereof and the lifting of the sheet stop means 96 to permit the glass sheet to pass therebeneath from the table. At this time, the current will enter from the positive main line through wire 354 and pass through contact plate 353, contact 352, and wire 355 to solenoid 115, and thence to the negative main line through wire 356. The fixed contact 341 is maintained in engagement with contact plate 342 at all times except momentarily when the cutting unit 24 approaches the end of its cutting cycle. On the other hand, the fixed contact 352 engages contact plate 353 only momentarily at the end of the cutting cycle and during that interval in which the contact 341 is removed from contact plate 342. Due to the fact that the fixed contact 352 engages contact plate 353 only momentarily, the stop plate 99 will be raised only momentarily to permit the forward end of the sheet to pass therebeneath, after which it will again be lowered to engage the glass. The provision of the freely rotatable rollers 118, however, permits the transfer of the sheet from the cutting table to the take-off conveyor 27 with very little friction.

The take-off conveyor 27 may be of any suitable construction, but as here shown includes an endless conveyor belt 28 which is adapted to receive and carry the sheet forwardly to any desired location. This conveyor may form part of an apparatus for effecting the automatic breaking of the glass sheet along the score lines and such an apparatus is disclosed and claimed in my copending application filed of even date herewith, Serial No. 296,443. When the glass sheet is passed onto the endless conveyor, the forward edge thereof is adapted to engage a stop strip 357 carried by rods 358 secured within brackets 359 on a supporting member 360. In order to prevent undue rebound of the sheet when it strikes the stop strip 357, there are provided stop plates 361 hinged as at 362 to plates 363 secured to the bar 100 by fastening means 364.

Figure 17:
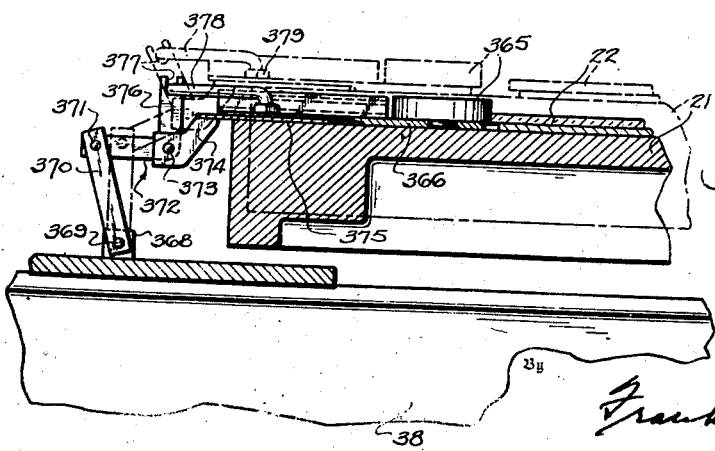
Fig. 17 is a detail vertical transverse section through the sheet supporting table taken substantially on line 17—17 of Fig. 16.

*Modified machine illustrated in Figs. 16, 17 and 18*

The machine illustrated in Figs. 16, 17 and 18 operates in substantially the same manner as the machine described hereinabove but differs therefrom in certain structural features. Therefore, only those parts which are different from the machine above disclosed will be set forth. In this modified construction, instead of providing individual spring-pressed guide rollers 89 and 90 along the back edge of the table 21, as shown in Fig. 1, there are provided a plurality of horizontally aligned rotatable guide rollers 365 carried by a slide plate 366 resting upon the top of the table. These guide rollers 365 are adapted to be disposed in the broken line position indicated in Fig. 16 when the glass sheet is moved into position for cutting upon the table, but when the table is elevated the guide rollers are adapted to be automatically moved rearwardly to full line position so that the rear edge of the sheet can be butted against the fixed clamping blocks 131 by the movable clamping blocks 135. Mounted upon the supporting frame 38 at the back of the table is a bracket 368 and pivoted thereto, as at 369, is a vertical arm 370 to the upper end of which is pivoted, as at 371, the horizontal portion of a bell-crank lever 372. This bell-crank lever is also pivoted intermediate its ends, as at 373 to an angle 374 having secured to its upper end a horizontal plate 375 which slides beneath the outer end of plate 366 carrying the guide rollers 365. The substantially vertical portion 376 of bell-crank lever 372 is provided with a notch 377 and loosely received therein is the outer end of a substantially horizontal rod 378 secured at its inner end to the slide plate 366 as at 379.

In operation, when the table 21 is in lowered position, the various parts are in the position indicated in full lines in Fig. 17, with the guide rollers 365 supported upon the table in forward position. However, when the table is raised, the upward movement of the angle 374 and plate 375 will cause the bell-crank lever 372 to be rocked in a counter-clockwise direction upon pivot 373 to cause it to assume the broken line position. At this time, the upper end of the bell-crank lever will also be moved rearwardly, and this will cause the guide rollers 365 to also be drawn rearwardly. The sliding movement of plate 366 upon plate 375 is facilitated by the freely rotatable guide rollers 380 carried by plate 375 and engaging the edges of slide plate 366.

Another feature of this construction is that in place of using two cams 30 and 31 for lifting the cutting wheel 25 at the beginning and end of the cutting operation, a single cam member 381 is employed for this purpose. By using a single cam member, the cutting wheel will be lifted up off of the sheet just before it reaches the rear edge 32 thereof at the completion of the cutting operation and will remain in raised position until it is lowered upon the sheet slightly inwardly of the rear edge thereof at the beginning of the next cutting operation. In this way, the cutting wheel is lowered and then raised only once during each cutting operation instead of being raised and lowered at the beginning and end of the cutting operation.

A further modification is that the cutter assemblies 36 and 37 for making the entering cuts are electrically operated instead of mechanically operated. As illustrated, each cutter assembly comprises a horizontal elongated supporting plate 382 extending forwardly from the table and carried by the frame 383. Slidably mounted upon the plates 382 are the slide plates 384 mounted between and guided by the rollers 385 and 386 on said plates 382. Carried at the forward end of each slide plate is the cutting tool 387. The two slide plates 384 are connected together by a transverse bar 388 and are normally urged inwardly by springs 389 secured at one end to the transverse bar 388 as at 390 and at the opposite end to the supporting plate 382 as at 391. The springs 389 serve to normally maintain the cutting tools 387 in forward position for cutting.

The outward movement of the cutting tools to effect the scoring of the glass sheet is controlled by a solenoid 392 carried by the supporting frame 383. Also carried by said frame is a sprocket 393 and trained about said sprocket is a chain 394 connected at one end to the transverse bar 388, as at 395, and at its opposite end to the vertical plunger 396 (Fig. 18) of solenoid 392. The cutting unit 24 carries an actuating member 397 which is adapted, upon travel of the cutting unit around the template 23, to actuate first a switch 398 carried by arm 399 to cause energization of the solenoid to move the cutting tools 387 outwardly to score the glass and subsequently switch 400 to break the circuit through said solenoid to permit return of the cutting tools 387 to cutting position.

As will be seen from an inspection of Fig. 18, before the cutting unit 24 has started to move around the template, the movable contact plates 401 and 402 of switches 398 and 400 respectively are in full line position in engagement with contacts 403 and 404, at which time the circuit through the solenoid is broken. However, when the cutting unit starts to travel around the template and member 397 engages switch 398, it will swing the contact plate 401 thereof over into engagement with contact 405 to complete the circuit through the solenoid 392. Thus, the current will enter from the positive main line 406 and pass through wires 407 and 408 through switch 398 to wire 409, through switch 400, wires 410 and 411 to the solenoid 392, and thence through wire 412 to the negative main line 413. Upon energization of the solenoid, the vertical plunger 396 thereof will be drawn downwardly to effect outward movement of the cutting tool 387 to make the entering cuts. The cutting tools will be maintained in outer position until the member 397 carried by the cutting unit actuates switch 400 to swing the contact plate 402 thereof into engagement with contact 414, at which time the circuit through the solenoid will again be broken whereupon the cutting tools will be returned to cutting position by the springs 389. However, upon cutting of the next sheet of glass, the member 397 will again actuate switch 398 to move the contact plate 401 thereof back into engagement with contact 403, at which time current will pass through wires 407 and 415, switch 400, wire 409, switch 398, wires 416 and 411 to the solenoid 392 and thence from the solenoid through wire 412. Upon continued movement of the cutting unit, the switch 400 will again be actuated to move the contact plate 402 thereof back into engagement with contact 404, at which time the circuit through the solenoid will again be broken. This cycle of operations will of course be repeated during the cutting of successive sheets of glass. Except for the differences set forth above, the machine of Figs. 16, 17 and 18 is the same and operates in the same manner as the machine of Figs. 1 to 15.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a machine for cutting sheets or plates of glass or the like, means for supporting the sheet to be cut, a cutting unit including a cutting tool movable over the sheet for scoring the same along a predetermined line of cut, and a second cutting tool actuated by said cutting unit when the latter reaches a predetermined position for scoring the sheet from the line of cut made by the first-mentioned cutting tool outwardly to an edge of the sheet.

2. In a machine for cutting sheets or plates of glass or the like, means for supporting the sheet to be cut, a cutting unit including a cutting tool movable over the sheet for scoring the same along a predetermined line of cut, a second cutting tool, means actuated by said cutting unit when the latter reaches a predetermined position for moving the second-mentioned cutting tool across the sheet to score the same from the line of cut made by the first-mentioned cutting tool to an edge of the sheet, and means for holding said second-mentioned cutting tool against return movement until the first-mentioned cutting tool completes its cutting operation.

3. In a machine for cutting sheets or plates of glass or the like, means for supporting the sheet to be cut, a cutting unit including a cutting tool movable over the sheet for scoring the same along a predetermined line of cut, a second cutting tool, means controlled by movement of said cutting unit for moving the second-mentioned cutting tool across the sheet to score the same from the line of cut made by the first-mentioned cutting tool to an edge of the sheet, means for holding said second-mentioned cutting tool against return movement until the first-mentioned cutting tool completes its cutting operation, and means also controlled by movement of said cutting unit for rendering said holding means ineffective to permit return of said second-mentioned cutting tool to operative position.

4. In a machine for cutting sheets or plates of glass or the like, means for supporting the sheet to be cut, a track template mounted above said sheet supporting means, a cutting unit mounted to travel along said template and including a cutting tool for scoring the sheet along a predetermined line of cut, a second cutting tool, means controlled by movement of said cutting unit for moving the second-mentioned cutting tool across the sheet to score the same from the line of cut made by the first-mentioned cutting tool to an edge of the sheet, and means for holding said second-mentioned cutting tool against return movement until the first-mentioned cutting tool completes its cutting operation.

5. In a machine for cutting sheets or plates of glass or the like, means for supporting the sheet to be cut, a track template mounted above said sheet supporting means, a cutting unit mounted to travel along said template and including a cutting tool for scoring the sheet along a predetermined line of cut, a second cutting tool, means controlled by movement of said cutting unit for moving the second-mentioned cutting tool across the sheet to score the same from the line of cut made by the first-mentioned cutting tool to an edge of the sheet, means for holding said second-mentioned cutting tool against return movement until the first-mentioned cutting tool completes its cutting operation, and means also controlled by movement of said cutting unit for rendering said holding means ineffective to permit return of said second-mentioned cutting tool to operative position.

6. In a machine for cutting sheets or plates of glass or the like, means for supporting the sheet to be cut, a template mounted above said sheet supporting means, a cutting unit mounted to travel along said template and including a cutting tool for scoring the sheet, and coacting means carried by said template and cutting unit for lowering the cutting tool upon the sheet slightly inwardly of the edge thereof at the beginning of the cutting operation and for raising said cutting tool from the sheet just before it reaches the edge thereof at the completion of the cutting operation.

7. In a machine for cutting sheets or plates of glass or the like, means for supporting the sheet to be cut, a template mounted above said sheet supporting means, a cutting unit mounted to travel along said template and including a cutting tool for scoring the sheet, and cam means carried by said template and engageable by a portion of said cutting unit for lowering the cutting tool upon the sheet slightly inwardly of the edge thereof at the beginning of the cutting operation and for raising said cutting tool from the sheet just before it reaches the edge thereof at the completion of the cutting operation.

8. In a machine for cutting sheets or plates of glass or the like, a vertically movable table for supporting the sheet to be cut, and means actuated by the sheet when it reaches a predetermined position upon the table for raising said table to cutting position and for maintaining it in raised position during the cutting operation.

9. In a machine for cutting sheets or plates of glass or the like, a vertically movable table for supporting the sheet to be cut, a track template mounted above said table, a cutting unit mounted to travel along said track template and including a cutting tool for scoring the sheet, means actuated by the sheet when it reaches a predetermined position upon the table for raising said table to cutting position and for maintaining it in raised position during the cutting operation, and means for automatically rendering said table raising means ineffective to permit lowering of said table when said cutting unit has completed its cutting operation and reaches a predetermined position upon said track template.

10. In a machine for cutting sheets or plates of glass or the like, a vertically movable table for supporting the sheet to be cut, fixed clamping means carried by said table and engaging one edge of the sheet, movable clamping means engaging the opposite edge of said sheet for holding the said sheet against the fixed clamping means, means actuated by the sheet when it reaches a predetermined position upon the table for raising said table to cutting position, and means actuated by said table upon raising thereof for substantially simultaneously causing said movable clamping means to clamp the sheet between the said fixed and movable clamping means.

11. In a machine for cutting sheets or plates of glass or the like, a vertically movable table for supporting the sheet to be cut, fixed clamping means carried by said table and engaging one edge of the sheet, substantially horizontal clamping means freely supported at their inner ends upon said table and engaging the opposite edge of said sheet for holding the said sheet against the fixed clamping means, means for pivotally supporting said movable clamping means at their outer ends for horizontal movement toward and away from the sheet, means actuated by the sheet when it reaches a predetermined position upon the table for raising said table to cutting position and for maintaining it in raised position during the cutting operation, and operative connections between said table raising means and the means for supporting said movable clamping means for substantially simultaneously actuating said movable clamping means to move the said movable clamping means inwardly to engage the sheet.

12. In a machine for cutting sheets or plates of glass or the like, means for supporting the sheet to be cut, a track template mounted above said sheet supporting means, a cutting unit mounted to travel along said track template and including a cutting tool for scoring the sheet, a motor for driving said cutting unit along said track template, and means actuated by the sheet when it is in proper position for cutting upon said supporting means for placing said motor in operation to effect the driving of the cutting unit around the track template.

13. In a machine for cutting sheets or plates of glass or the like, means for supporting the sheet to be cut, a track template mounted above said sheet supporting means, a cutting unit mounted to travel along said track template and including a cutting tool for scoring the sheet, a motor for driving said cutting unit along said track template, means actuated by the sheet when it is in proper position for cutting upon said supporting means for placing said motor in operation to effect the driving of the cutting unit around the track template, and means actuated by said cutting unit when it reaches a predetermined position upon said track template for shutting off said motor.

14. In a machine for cutting sheets or plates of glass or the like, means for supporting the sheet to be cut, a track template mounted above said sheet supporting means, a cutting unit mounted to travel along said track template and including a cutting tool for scoring the sheet, power actuated means for driving said cutting unit around said track template, means engaging said cutting unit for bringing it to a stop upon completion of the cutting operation, and means actuated by the sheet when it is in proper position for cutting upon said supporting means for rendering said stop means ineffective to permit movement of said cutting unit around said track template.

15. In a machine for cutting sheets or plates of glass or the like, means for supporting the sheet to be cut, a track template mounted above said sheet supporting means, a cutting unit mounted to travel along said track template and including a cutting tool for scoring the sheet, power actuated means for driving said cutting unit around said track template, means engaging said cutting unit for bringing it to a stop upon completion of the cutting operation, means actuated by the sheet when it is in proper position for cutting upon said supporting means for rendering said stop means ineffective to permit movement of said cutting unit around said track template, and means actuated by said cutting unit when it reaches a predetermined position upon said track template for causing the said stop means to return to operative position.

16. In a machine for cutting sheets or plates of glass or the like, a vertically movable table for supporting the sheet to be cut, a track template mounted above said table, a cutting unit mounted to travel along said track template and including a cutting tool for scoring the sheet, a motor for driving said cutting unit along said track template, and means actuated by the sheet when it reaches a predetermined position upon the table for raising said table to cutting position and for substantially simultaneously placing said motor in operation to effect the driving of the cutting unit around the track template.

17. In a machine for cutting sheets or plates of glass or the like, a vertically movable table for supporting the sheet to be cut, a track template mounted above said table, a cutting unit mounted to travel along said track template and including a cutting tool for scoring the sheet, a motor for driving said cutting unit along said track template, means engaging said cutting unit for bringing it to a stop upon completion of the cutting operation, and means actuated by the sheet when it reaches a predetermined position upon the table for raising said table to cutting position and for substantially simultaneously rendering said stop means ineffective and placing said motor in operation to effect the driving of the cutting unit around the track template.

18. In a machine for cutting sheets or plates of glass or the like, a vertically movable table for supporting the sheet to be cut, a track template mounted above said table, a cutting unit mounted to travel along said track template and including a cutting tool for scoring the sheet, a motor for driving said cutting unit along said track template, means engaging said cutting unit for bringing it to a stop upon completion of the cutting operation, means actuated by the sheet when it is in proper position for cutting upon said table for raising said table to cutting position and for substantially simultaneously rendering said stop means ineffective and placing said motor in operation to effect the driving of the cutting unit around the track template, means for automatically rendering said table raising means ineffective to permit lowering of said table when said cutting unit has completed its cutting operation and reaches a predetermined position upon said track template, means actuated by said cutting unit when it reaches a predetermined position upon said track template for shutting off said motor, and means actuated by said cutting unit when it reaches a predetermined position upon said track template for causing the said stop means to return to operative position.

19. In a machine for cutting sheets or plates of glass or the like, means for supporting the sheet to be cut, a cutting unit including a cutting tool movable over the sheet for scoring the same along a predetermined line of cut, a second cutting tool, means for supporting said second-mentioned cutting tool for horizontal movement, and coacting means carried by said cutting unit and supporting means for the second-mentioned cutting tool and engageable when the said cutting unit reaches a predetermined position for moving the said second-mentioned cutting tool outwardly to score the sheet from the line of cut made by the first-mentioned cutting tool to an edge of the sheet.

20. In a machine for cutting sheets or plates of glass or the like, means for supporting the sheet to be cut, a track template mounted above said supporting means, a cutting unit mounted to travel along said template and including a cutting tool for scoring the sheet along a predetermined line of cut, a second cutting tool, means for supporting said second-mentioned cutting tool for horizontal movement, coacting means carried by said cutting unit and supporting means for said second-mentioned cutting tool and engageable when the said cutting unit reaches a predetermined position in its travel along said template for moving the said second-mentioned cutting tool outwardly to score the sheet from the line of cut made by the first-mentioned cutting tool to an edge of the sheet, and means for holding said second-mentioned cutting tool against return movement until the first-mentioned cutting tool completes its cutting operation.

21. In a machine for cutting sheets or plates of glass or the like, means for supporting the sheet to be cut, a track template mounted above said supporting means, a cutting unit mounted to travel along said template and including a cutting tool for scoring the sheet along a predetermined line of cut, a second cutting tool, means for supporting said second-mentioned cutting tool for horizontal movement, coacting means carried by said cutting unit and supporting means for said second-mentioned cutting tool and engageable when the said cutting unit reaches a predetermined position in its travel along said template for moving the said second-mentioned cutting tool outwardly to score the sheet from the line of cut made by the first-mentioned cutting tool to an edge of the sheet, means for holding said second-mentioned cutting tool against return movement until the first-mentioned cutting tool completes its cutting operation, and means controlled by movement of said cutting unit for rendering said holding means ineffective to permit return of said second-mentioned cutting tool to operative position.

JOSEPH R. MORRIS.